United States Patent [19]

Cooke et al.

[11] Patent Number: 4,990,594
[45] Date of Patent: Feb. 5, 1991

[54] PRODUCING A COPOLYESTER FROM A LOWER DIALKYL ESTER OF TEREPHTHALIC ACID, A GLYCOL AND A DICARBOXYLIC ACID

[75] Inventors: Anthony W. Cooke; Monika E. Bader, both of Charlotte, N.C.

[73] Assignee: Hoechst Celanese Corporation, Somerville, N.J.

[21] Appl. No.: 489,583

[22] Filed: Mar. 7, 1990

[51] Int. Cl.$^5$ ............................................. C08G 63/02
[52] U.S. Cl. ........................... 528/272; 528/275; 528/280; 528/285; 528/286; 528/298; 528/302; 528/308; 528/308.6; 524/706; 524/710; 524/711; 524/845; 524/878
[58] Field of Search .............. 528/272, 275, 280, 285, 528/286, 298, 302, 308, 308.6; 524/706, 710, 711, 845, 878

[56] References Cited

U.S. PATENT DOCUMENTS

| | | | |
|---|---|---|---|
| 3,487,049 | 12/1969 | Busot | 526/65 |
| 3,657,180 | 4/1972 | Cohn | 524/775 |
| 3,709,859 | 1/1973 | Hrach et al. | 528/276 |
| 3,907,754 | 9/1975 | Tershansy et al. | 528/277 |
| 3,951,905 | 4/1976 | Sano et al. | 524/399 |
| 3,962,189 | 6/1976 | Russin et al. | 528/277 |
| 4,010,145 | 3/1977 | Russin et al. | 528/280 |
| 4,107,149 | 8/1978 | Bier et al. | 528/309 |
| 4,501,878 | 2/1985 | Adams | 528/286 |

FOREIGN PATENT DOCUMENTS 1,417,738 12/1975 Great Britain .
1,522,656 8/1978 Great Britain .

*Primary Examiner*—John Kight, III
*Assistant Examiner*—S. A. Acquah
*Attorney, Agent, or Firm*—Philip P. McCann

[57] ABSTRACT

A process for producing a copolyester by copolymerizing the monomers from the ester interchange of a lower dialkyl ester of terephthalic acid and glycol and the direct esterification of a dicarboxylic acid and glycol using a novel catalyst system. The novel catalyst composition includes from about 20 ppm to about 150 ppm manganese; from about 50 ppm to about 350 ppm lithium; preferably from about 10 ppm to about 70 ppm cobalt; and from about 200 ppm to about 400 ppm antimony, all amounts being based upon the expected yield of the copolyester. The novel process to make copolyester includes the step of employing an effective catalytic amount of manganese and lithium in an ester interchange reaction where the lower dialkyl ester and glycol produce a first monomer; to the monomer adding a slurry of dicarboxylic acid and glycol and employing an effective catalytic amount of lithium and cobalt in a direct esterification reaction where the dicarboxylic acid and glycol produce a second monomer; and using an effective catalytic amount antimony in a copolycondensation reaction of the monomers. Using the catalyst system allows for the combination of the ester interchange reaction with the direct esterification reaction to produce a copolyester.

18 Claims, No Drawings

PRODUCING A COPOLYESTER FROM A LOWER DIALKYL ESTER OF TEREPHTHALIC ACID, A GLYCOL AND A DICARBOXYLIC ACID

BACKGROUND OF THE INVENTION

1. Field of the Invention

The present invention relates to a process for producing a copolyester from a lower dialkyl ester of a terephthalic acid (LDE), a glycol (GLY) and a dicarboxylic acid (DA). Using a specific catalyst system of the present invention allows to conveniently produce the copolyester by sequencing an ester interchange and direct esterification. In particular, the catalyst system comprises manganese (Mn), lithium (Li), antimony (Sb) and optionally cobalt (Co). More specifically, manganese and lithium are used as catalysts for the ester interchange of the LDE and GLY, lithium for the direct esterification of DA and GLY, while lithium cobalt and antimony are used as catalysts for the polycondensation stage. The manganese is sequestered after the ester interchange. It has been found a copolyester can be produced by adding a slurry of DA/GLY to the reaction product of LDE and glycol of the ester interchange, reacting the DA/GLY slurry by direct esterification therein and copolymerizing the two reaction products.

Furthermore, copolyesters of the present invention are demonstrated to have improved melt flow characteristics and in solid form, improved cutting characteristics during processing and increased tensile strength when bonded in a blend with other polyester fibers.

Copolyesters of the present invention can be used as binder fibers in nonwoven applications or can be used in conjunction with polyester fiber in bicomponent fibers.

PRIOR ART

In prior art processes, copolyesters can be produced by two different routes: ester interchange plus polycondensation, referenced herein as the ester interchange route; or direct esterification plus polycondensation, referenced herein as the direct esterification route. Generally, the ester interchange route can be used with either a batch type process or a continuous process, while the direct esterification route uses a continuous type process.

In the ester interchange route, dimethyl terephthalate (DMT), dimethyl isophthalate (DMI) and ethylene glycol (EG) are typically reacted in the presence of a catalyst (manganese) at atmospheric pressure and at a temperature of from about 180° C. to 230° C. In the presence of the catalyst, these components undergo ester interchange to yield two intermediate monomers and methanol. The reaction which is conveniently done with about 1 mole of DMT, about 0.4 mole of DMI and 2.8 to 3.2 moles of EG, is reversible and is carried to completion by removing methanol formed. During the ester interchange, the two intermediate monomers are the substantial majority product (not considering the methanol), along with small amounts of low molecular weight oligomers.

The monomers are then polymerized by a polycondensation reaction, where the temperature is raised to about 270° C. to about 300° C. and the pressure is reduced to below 1 mm of mercury vacuum and in the presence of a suitable polymerization catalyst (antimony). From this reaction, polyethylene terephthalate/isophthalate) and ethylene glycol are formed. Because the reaction is reversible, the glycol is removed as it is evolved, thus forcing the reaction toward the formation of the polyester.

Manganese is the preferred catalyst for ester interchange reactions, but the amount of manganese employed must be strictly controlled. The presence of too little manganese during the ester interchange reaction results in very long reaction times, while the presence of too much manganese results in unwanted side products during the polycondensation reaction, and unacceptable degradation of the copolyester resulting in poor color (thus lowering the quality of the copolyester). The exact range of manganese which proves to be the most desirable must generally be determined through trial and error because many factors affect the reactivity of the manganese. For example, reaction temperature, reaction pressure, the degree of mixing during reaction, the purity of the raw materials, the presence of other additives, etc., all affect the effectiveness of manganese.

In prior art process, manganese was employed to obtain suitable ester interchange reaction times, but the manganese must be sequestered after ester interchange or during polycondensation by a polyvalent phosphorous compound to aid in reducing the discoloration and unwanted side products. Generally, prior art processes employed about 50 ppm to 150 ppm manganese based on he expected yield of the polymer, as the ester interchange catalyst. Using more than about 150 ppm manganese resulted in polymer degradation even if phosphorous was employed in excess to sequester the manganese. It is believed that this occurred because the phosphorous was incapable of complexing with the manganese to the degree necessary to prevent discoloration.

Known disadvantages for making copolyesters using the ester interchange route starting with a mixture of DMT and DMI are the high price of the DMI and low quality of DMI.

Another method to make copolyesters is by direct esterification. By this method, terephthalic acid (TA), isophthalic acid (IPA) and EG are typically reacted without any catalyst in a continuous process. Normally, the TA and IPA are reacted at a pressure of from about 5 psia to 85 psia and at a temperature from about 185° C. to 290° C. These components undergo direct esterification to yield two intermediate monomers and water. The reaction is conventionally done with amounts of TA and IPA corresponding to the desired mixture in the copolyester. For example, if a 60/40 (terephthalate/isophthalate) is desired, then 1.2 mole of TA, 0.8 mole of IPA and from 2.4 to 3.2 moles of EG are reacted.

After the completion of the direct esterification, the monomers are then polymerized by the polycondensation reaction as described in the ester interchange process.

As previously noted, direct esterification is generally conducted in a continuous process. Although this process overcomes the problems resulting from ester interchange due to the use of DMI, other problems occur relating to the use of the continuous process to make copolyester, in particular when relatively small amounts of copolyester are required. Continuous processes are cost effective to operate when relatively large amounts of polyester or copolymer are required. Smaller lot sizes of either polyester or copolyester are produced more cost effectively by a batch process. To this end, the present invention provides a process that can be made using the batch process without the use of dimethyl isophthalate. Furthermore, the present invention may also be used in a continuous process.

One use of copolyesters is in thermally bonded fibrous nonwoven applications such as medical face masks wherein polyester fibers are thermally bonded to copolyester binder fibers that have been blended with the polyester fibers. The thermal bonding is attributed to the copolyester fiber having a lower melting point than the blended polyester fiber. An example of such a copolyester is poly(ethylene terephthalate/isophthalate) having a terephthalate/isophthalate mole ratio from about 80/20 to 50/50.

Nonwoven products may also be formed of bicomponent fibers having a polyester core and a copolyester sheath. Such bicomponent fibers act as the binder fibers when blended with polyester fibers to make nonwovens.

The following references are directed to various DMT type processes and catalyst systems used for either making polyester or copolyester.

U.S. Pat. No. 3,709,859 to Hrach et al discloses a multi-component catalyst system for producing polyester via the ester interchange process. Among the many catalysts mentioned are lithium, cobalt, manganese and antimony. Although these catalysts are set forth in the background portion of the patent, the patent claims a catalyst system comprising antimony, lead, and calcium, and additionally strontium or barium. Hrach et al also teach the necessity of employing pentavalent phosphorous compounds as stabilizers in order to prevent the formation of discolored polyester.

British Patent No. 1,417,738 to Barkey et al discloses a process for manufacturing polyester in which a preferred ester interchange catalysts may include zinc, manganese, cobalt, and lithium, among others. Preferred polycondensation catalysts include antimony compounds. This reference, however, claims other catalyst compounds and mentions the above catalyst only as background information.

Various patents assigned to Eastman Kodak Company (British Patent Nos. 1,417,738, and 1,522,656; U.S. Pat. Nos. 3,907,754, 3,962,189, and 4,010,145) disclose a broad variety of catalyst systems, including a manganese, cobalt, lithium and titanium combination and a manganese, titanium, cobalt and antimony catalyst system, with phosphorous being used in each of these systems as a sequestering agent. Each of these catalysts was added at the beginning of ester interchange and are used as catalysts for the ester interchange. The purpose of the catalyst system is to speed up the production of the copolyester.

The following references teach preparation of a polyester by the ester interchange process with the addition of small amounts of TA in the polycondensation step utilizing various catalyst systems.

U.S. Pat. No. 3,657,180 to Cohn discloses a process for making copolyester resin in which lithium or a divalent metal compound are employed as catalyst. The specification states that manganese may be one of the divalent metallic compounds which can be employed. The order of mixing the various raw materials and the addition of the compounds to the process described in the Cohn invention is stated to be critical. The process is carried out by reacting DMT and ethylene glycol in the presence of a lithium salt under ester interchange conditions followed by the addition of manganese. In another embodiment, the process also includes using manganese as a catalyst with lithium being added after the ester interchange reaction. In either case, the second metal is always added after ester interchange, and thus is not used as a catalyst for the ester interchange. Moreover, the second metal is added in a higher than catalytic amount and is added to act as a slip agent. The second metal is added along with a slurry in the amount of less than 1% of product of glycol and a small amount of terephthalic acid before vacuum-let-down to provide slip for polyester film and the amount added is several factors larger than catalytic amount.

U.S. Pat. No. 3,487,049 to Busot discloses a catalyst system of manganese, sodium and antimony Furthermore, a small amount of terephthalic acid mixed in a glycol slurry is added to the reactor during vacuum-let-down (at 30 mm mercury) for increasing the polymerization rate, etc. Less than 4.0 percent of product weight of TA was added in this teaching.

Improvements directed to the reduction of ester interchange time or polycondensation time through the use of various catalyst systems and the addition of a very small amount of TA/glycol slurry are not particularly advantageous to the production of a copolyester through the novel sequencing of the ester interchange, direct esterification and polycondensation. In fact, although the catalyst systems disclosed in the prior art described herein may be suitable for reducing ester interchange time, they are found to differ from the catalyst system used in the present invention. As will be shown in the Examples, various use of catalyst systems may produce copolyester, but the quality has been found unacceptable. In particular, it has been found that the timing of the addition of the polycondensation catalysts also contribute to the production of the copolyester.

It is an aim or aspect of the present invention to not only feasibly produce a copolyester by the LDE type process from available suitable raw materials, but produce a copolyester which has acceptable color, IV and thermal properties.

SUMMARY OF THE INVENTION

The present invention provides a unique process of preparing a copolyester by effectively sequencing the ester interchange and direct esterification reactions and the polycondensation reaction through the use of a unique catalyst system. In particular, the present invention comprises a process for making copolyester wherein a catalyst consisting of manganese and lithium are used for the ester interchange and direct esterification reactions and the catalysts of cobalt (optional) and antimony are employed in the polycondensation reaction.

In the broadest sense, the present invention comprises a method for making a copolyester from a lower dialkyl ester of terephthalic acid, a dicarboxylic acid and a suitable glycol comprising the steps of: reacting the glycol with the LDE at a molar ratio of between about 1.4/1 to about 2.5/1, at a suitable temperature and pressure and in the presence of an effective amount of manganese and lithium catalysts sufficient to produce a first monomer and alcohol; removing the resultant alcohol to more completely react the LDE and glycol; adding a mixture of glycol and dicarboxylic acid at a weight percent from about 20/80 to about 80/20 to the first monomer and reacting the mixture in the presence of an effective amount of lithium catalyst sufficient to produce a second monomer and water; reducing the pressure to a vacuum pressure sufficient to initiate polycondensation; copolymerizing the resultant monomers at a suitable temperature and pressure and in the presence of an effective amount of antimony catalyst and optionally, but preferably a cobalt catalyst to form a copolyester.

The present invention also comprises a copolyester product made by the above-mentioned process.

The present invention also comprises a bicomponent fiber having a polyester core, a copolyester sheath made by the above-mentioned process.

Such copolyester and bicomponent fibers can be blended with staple crimped polyester fibers and thermally bonded into nonwoven fabrics.

DESCRIPTION OF THE PREFERRED EMBODIMENTS

A copolyester of the present invention is prepared from a lower dialkyl ester of a terephthalate acid (LDE), dicarboxylic acid and glycol. Suitable LDE's include dimethyl terephthalate, diethyl terephthalate, dipropyl terephthalate, dibutyl terephthalate, dialkyl naphthalates such as 2.6 dimethyl naphthalate, or mixtures of two or more of these.

Dicarboxylic acids suitable for combination with LDE include acids having the formula

wherein R is a selected from the group consisting of

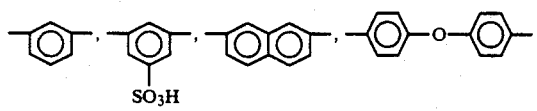

and $-(CH_2)_n$ where $n = 2-12$.

Suitable dicarboxylic acids include isophthalic acid, adipic acid and naphthalic acid.

The glycol (GLY) may comprise ethylene glycol, diethylene glycol, polyethylene glycol, blends of ethylene glycol and propane and/or butane diol, or mixtures of two or more of these.

The catalyst system used in the present invention comprises from about 20 ppm to about 150 ppm manganese (Mn); from about 50 ppm to about 350 ppm lithium (Li); optionally, but preferably from about 10 ppm to about 70 ppm cobalt (Co); and from about 200 ppm to about 400 ppm antimony (Sb), based upon the expected yield of the copolyester. This catalyst system, when used in the most effective amounts, increased the ester interchange rate, direct esterification rate, and polymerization rate, thereby reducing time to perform these functions.

Generally, the Mn and Li are added before the beginning of or during the ester interchange reaction. At the end of ester interchange or any time before direct esterification, the manganese is sequestered in those situations where polymer color is important by the addition of a sequestering agent, discussed in more detail later. Also, the manganese is sequestered to allow for optimum rates for direct esterification and polycondensation. The Li remains in the reaction and acts as a catalyst in the direct esterification reaction and the polymerization. The Sb can be added before the beginning of or during polymerization as explained more fully later and is a catalyst only for the polycondensation. The Co can be added at any time subsequent to the stabilization of the manganese. In the past Co has generally been considered to be an ester interchange catalyst. In the present invention, in the presence of Li and Mn, Co is found to delay the ester interchange reaction but is effective as a polycondensation catalyst.

When stating that the manganese and lithium can be added at any time before or during ester interchange, it is intended to include the addition of the catalyst metals in the LDE, glycol, or other feedstock material streams. For example, a part, or all the ester interchange catalysts could be added into the glycol feedstream. Moreover, if the feed stream would also include other additives such as colorants, delustrants, opaquing agents, etc., the catalyst for the ester interchange process (manganese and lithium) could be a part of the additive feed stream. Also, additional lithium for the direct esterification is added with the DA/glycol slurry.

When stating that cobalt and antimony can be added at any time before or during polymerization, it is intended to include the fact that antimony can be added at any time, including with the other metal catalyst of manganese and lithium, in the LDE, glycol, or other ester interchange feedstock material streams or in the DA/glycol slurry. Cobalt, on the other hand, must be added only after substantial completion of the ester interchange reaction. The addition of cobalt before substantial completion of ester interchange retards the ester interchange reaction rate. Thus, whether antimony is added with other catalysts in the feedstock streams, or is added with the cobalt after the ester interchange reaction does not make any difference in the copolyester produced.

Although metals are described for the catalyst system of the present invention, the catalyst may be added in the form of many different compounds. For example, compounds such as oxides and acetates are the most preferred, while such organic and inorganic compounds as carbonates, phosphates (except manganese phosphates), halides, sulfides, amines, compounds of Group VI, etc., may also be employed. Preferably, manganese, lithium, and cobalt are added as catalysts in the form of acetates, while antimony is generally added in the form of antimony oxide. All catalyst compounds can also be used in the glycolized form of pre-reacting with glycol. When a catalyst is added in the form of a compound, the amount of compound added is determined by the amount of metal catalyst desired and the amount of metal catalyst available in the compound.

Other additives may be included in the general procedure outlined above, such as coloring agents, delustrants, opaquing agents, stabilizers, etc. These additives do not add or detract from the present invention.

In the process of the present invention, GLY and LDE are reacted in a batch process at temperature of between 150° C. to 250° C. at approximately atmospheric pressure in an ester interchange reaction to produce a first monomer and alcohol. The LDE and GLY are reacted in the presence of manganese and lithium and are generally reacted in a molar ratio of GLY to LDE, for example, of about 1.4/1 to 2.5/1, preferably between 2.0/1 to 2.5/1. Because the ester interchange reaction is reversible, it is necessary to remove the alcohol formed to assure that the reaction favors the formation of monomer bis (2-hydroxyethyl)

terephthalate (when using dimethyl terephthalate and ethylene glycol).

It is theorized that lithium initiates the ester interchange reaction between the LDE and the glycol at a lower temperature than the effective temperature range of manganese. Although Applicants do not wish to be bound by this theory, it is believed that the addition of lithium and manganese in the ester interchange reaction increases the ester interchange rate thereby reducing the ester interchange time.

The reactivity of manganese as a catalyst occurs at a higher temperature than that of lithium. Manganese has a very high reactivity in both the ester interchange reaction and the polycondensation reaction. It is generally preferred to sequester the manganese such that it is inert during the direct esterification reaction and the polycondensation reaction, particularly when the polyester is to be employed in applications where color is important. Unsequestered manganese produces a polymer with poor color, the polymer has a broader molecular weight distribution, which is generally undesirable, and when manganese is active as a catalyst in the polycondensation stage, many undesirable by-products such as oxides, carboxyl groups, etc., are created.

The typical sequestering agent is a multivalent phosphorous. Thus, at the end of the ester interchange reaction or during the polycondensation reaction, a tri- or penta-valent phosphorous compound is usually added. Typical phosphorous compounds suitable as sequestering agent for the manganese are tributyl phosphate, polyphosphoric acid, triphenylphosphite, etc. It is believed that the phosphorous forms a complex with the manganese which is very stable and thus causes the manganese to be almost unavailable for catalytic activity during the direct esterification reaction and polycondensation reaction. On the other hand, it is believed that phosphorous does not form a stable complex with the lithium, cobalt, nor antimony. Thus, each of these compounds would be reactive whenever conditions are achieved (such as temperature) that make them a catalyst for the production of the copolyester.

It is noted that the phosphorous complex does not sequester 100 percent of the manganese. Thus in choosing the manganese level, it must be kept in mind that use of manganese yields bad polymer color, undesirable by-products, and broad molecular weight distribution for the polymer formed. With the present invention, it is desirable to provide a balance between the manganese and lithium as the ester interchange catalyst such that the reactivity, reaction speed, and side reactions are controlled in a manner to produce a quality product. Accordingly, it is important that a sufficient amount of manganese be employed that will speed up the ester interchange reaction beyond that which can occur when only lithium is being employed, but, on the other hand, employing a sufficient amount of lithium to achieve good color of polymer, to avoid side reactions, and to achieve a narrower molecular weight distribution of the polymer, which are the benefits of the lithium catalyst. Moreover, the lithium catalyst is also active, because it has not been sequestered, during the polycondensation reaction and thus aids in reducing the overall polycondensation time over a catalyst system that uses antimony alone.

After the manganese catalyst has been sequestered, a slurry of dicarboxylic acid (DA) and glycol is added to the first monomer. The DA is added in an amount of from about 10 to about 50 percent by weight based on the amount (weight) of the copolyester. The DA is added as a slurry with glycol in the range from 80/20 to 20/80 weight percent of DA/glycol. Adding DA to glycol in amounts greater than 80/20 results in the slurry being too thick to pump. Using a slurry less than 20/80 adds too much glycol resulting in a poor hydroxyl/carboxyl balance.

Preferably, the DA/glycol slurry also contains a catalytic amount of lithium, that amount being up to 50% of the total lithium used for the ester interchange reaction and the direct esterification.

In the process of the present invention, the DA and glycol slurry are reacted to the first monomer, at a temperature of between 180° C. to 250° C. at approximately atmospheric pressure in a direct esterification reaction to produce a second monomer and water in the first monomer. Because the direct esterification is reversible, it is necessary to remove the water formed to assure that the reaction favors the formation of the second monomer bis (2-hydroxyethyl)isophthalate (when using isophthalic acid and ethylene glycol). It is theorized that during direct esterification isophthalic acid reacts with the hydroxyl groups of the glycol to form water which has a vapor pressure higher than that of glycol.

After the direct esterification, the antimony catalyst may be added. It is important that cobalt not be added during the ester interchange reaction because it has been determined that an ester interchange catalyst system of cobalt, manganese, and lithium actually slows down the ester interchange reaction rate and increases the ester interchange time over that of a manganese and lithium catalyst system and produces a gray polymer which may be unacceptable in those applications where color is important. Since cobalt cannot be added until after substantial completion of the ester interchange reaction, the cobalt is added after the manganese has been stabilized Likewise, the antimony may also be added at the time of the addition of the sequestering agent or shortly thereafter.

On the other hand, the antimony catalyst may be added with the various raw material feedstock streams in the same manner as the ester interchange catalyst of manganese and lithium. Antimony is not effective during the ester interchange reaction or the direct esterification reaction because the temperature of these reactions are lower than the reactivity temperature of antimony for producing the copolyester. Thus, the antimony can be added any time before or during the polycondensation reaction.

At the end of the direct esterification reaction, the first monomer and second monomer are then subjected to a polycondensation reaction to yield a copolyester and glycol. The polycondensation reaction occurs at a temperature range of between 250° C. to 310° at a vacuum pressure of approximately 0.1 to 3 mm of mercury. The reaction is reversible and, therefore, glycol is continuously removed to force the completion of the reaction toward the production of a copolyester. After the direct esterification reaction and the polycondensation reaction, it is necessary to reduce the pressure from that of the direct esterification reaction to what is required for the polycondensation reaction. This period of time is typically called the vacuum-let-down time. It is preferred to add the antimony catalyst before the start of the vacuum-let-down in those situations where opening the reaction vessel would break the vacuum, necessitating restarting the vacuum-let-down.

It is theorized that lithium and antimony increase the polycondensation rate and that the optional addition of between about 10 ppm and 70 ppm of cobalt, based upon the expected yield of the polyester, to the polycondensation reaction, further increases the polycondensation rate over that of lithium and antimony, and thereby reduces the polycondensation time further than that achieved with lithium and antimony.

Generally, using an amount of any one of the catalysts which is outside the ranges of the present invention is not desirable. Using an amount less than about the minimum stated for any of the catalyst generally yields a result which is not as substantial as that obtained with the present invention. Using an amount more than about the maximum stated for any of the catalyst produces undesirable effects such as poor color, unwanted side products, high cost, etc.

Experimental Procedure

Autoclave batches were prepared in which batches of roughly 1000 grams of polymer for Example 1 were produced at approximately 2.5 to 1 mole ratio of ethylene glycol (EG) to DMT in a batch process, while the batches of roughly 1,800 kilograms of polymer for Example 2 were produced from 2.2 to 2.5 mole ratio of EG/DMT. In each case, the autoclave was first charged with the raw materials including DMT, ethylene glycol and the catalyst used for the particular experiment. Titanium dioxide was also added in the initial charge as a delustrant. When the following experiments employed the catalyst, manganese, lithium, or cobalt, these metals were added in the form of acetates, and antimony was added in the form of oxide, with the amount of catalysts added being based upon the metals themselves. The autoclave was then heated to approximately 155° C. at atmospheric pressure where initiation of the ester interchange began.

During charging of the raw materials, the autoclave was subjected to an inert gas (nitrogen at 4 standard cubic feet per hour) to aid in preventing oxidation. Generally, the autoclave was agitated with a stirrer to assure homogenous commingling of the raw materials. At the start of the ester interchange reaction (approximately when the reactor contents reached 155° C.), the flow of nitrogen gas was terminated and the starting time was recorded. The autoclave temperature during ester interchange rose from approximately 155° C. to about 210 to 230° C. During the ester interchange the methanol wa continuously removed to force the reaction toward the production of the monomer. At this point of the reaction, the ester interchange reaction was substantially complete and polyvalent phosphorous (for example, tributylphosphate) was added to sequester the manganese. During the addition and mixing of the phosphorous compound the nitrogen gas was once again turned on.

After neutralizing the manganese, the slurry of isophthalic acid/ethylene glycol (IPA/EG) was added in a ratio of 40/60 of IPA to EG. Included in the slurry was the various indicated catalyst in the form described above. The initial addition of the IPA/EG slurry caused the temperature of the contents of the autoclave to lower. The temperature actually dropped to between about 170° and 180° C. Heat was then applied to the autoclave to slowly raise the temperature from 235° to 250° C. at atmospheric pressure where initiation of the direct esterification began. Throughout the direct esterification, the autoclave was agitated with a stirrer to assure homogenous commingling of the materials. A slight nitrogen over pressure was maintained on the reactants. The starting time was recorded after the IPA/EG slurry is added. During direct esterification the water was removed to promote the direct esterification and force the reaction toward the production of the second monomer. Also, excess glycol was being taken off from the reactants. It is noted that the reaction was completed when the reaction temperature leveled off at about 240° C..

For Example 1, polycondensation was performed in the same autoclave while in Example 2, the comonomers were transferred to a vessel capable of having a vacuum pulled thereon.

The catalysts added after ester interchange reaction were added in the amounts indicated with the IPA/EG slurry. Vacuum-let-down was initiated and during this time the flow of nitrogen gas was once again terminated. During vacuum-let-down a vacuum is drawn on the autoclave until a vacuum of about 1.0 mm of mercury or lower is achieved. At the end of the vacuum-let-down, the autoclave was again heated to about 270° C. to about 290° C. thereby initiating the polycondensation reaction. The polycondensation reaction proceeded until substantial completion, during which the glycol formed was removed. The polycondensation time was recorded at the end of the vacuum letdown.

Once the copolyester was formed, the copolyester was tested for intrinsic viscosity (IV), color, glass transition temperature, number of carboxyl end groups (CEG) expressed in micro equivalents per gram, the mole percent of diethylene glycol (DEG) present, and the presence of various catalytic components. The color test was ASTM Method E308-85. The IV was tested at 25° using a orthochlorophenol solvent in which 8 grams of the polymer was mixed with 100 ml of the solvent. The $T_g$ was determined by Differential Scanning Colorimetry.

EXAMPLE 1

Various catalyst systems were employed to demonstrate the system used in the present invention. Furthermore, the controls were included to demonstrate the subtle differences of the timing of the incorporation of the various catalysts, i.e. the cobalt. In Experiment 1 (a control), manganese, cobalt and antimony were employed at about 54 ppm manganese, 18 ppm cobalt and 350 ppm antimony, based upon the expected yield of the polymer. The manganese was in the form of manganese acetate and the cobalt was in the form of cobalt acetate and the antimony in the form of antimony oxide. The components were added as described previously under experimental conditions. At the end of ester interchange, 54 ppm of phosphorous was added. No lithium was added in this experiment and the cobalt was added at the beginning of the ester interchange.

Experiment 2 (control) manganese, lithium and cobalt were added prior to the ester interchange, additional lithium was added after the ester interchange and prior to the direct esterification along with antimony as a polycondensation catalyst. The amount of manganese was 54 ppm, the amount of lithium for ester interchange was 145 ppm, the amount of cobalt was 18 ppm, the amount of lithium added after ester interchange was 145 ppm and the amount of antimony added after the ester interchange was 330 ppm. The cobalt was added simultaneously with the manganese and lithium which were charged into the autoclave with the raw components for the ester interchange. At the end of the ester interchange, 54 ppm of phosphorous was added.

In Experiment 3 manganese and lithium were added prior to ester interchange reaction, additional lithium added for direct esterification and cobalt and antimony were added as the catalysts for the polycondensation reaction. Specifically, 54 ppm of manganese and 145 ppm of lithium were added in the form of acetates for ester interchange, 145 ppm of lithium was added for direct esterification, and 18 ppm of cobalt was added after ester interchange reaction in the form of an acetate and 330 ppm of antimony was added in the form of an oxide. At the end of the ester interchange reaction 54 ppm of phosphorous was added.

The reaction times, IVs, $T_g$'s, colorants, CEG, DEG, and amounts of catalysts were measured. The results of the Example are set forth in Table 1.

TABLE 1

|  | (control) Experiment 1 | (control) Experiment 2 | Experiment 3 |
|---|---|---|---|
| Ester interchange catalyst | Mn/Co | Mn/Co/Li | Mn/Li |
| Direct esterification catalyst |  | Li | Li/ |
| Polycondensation catalyst | Sb | Sb | Co/Sb |
| Ester interchange time (min.) | 130 | 175 | 130 |
| Direct esterification time (min.) | 115 | 125 | 120 |
| Polycondensation time (min.) | 135 | 135 | 120 |
| Total Reaction | 380 | 435 | 370 |
| IV in deciliters/gm | .606 | .632 | .600 |
| $T_g$ C.° | 68.6 | 68.1 | 70.0 |
| CEG | 22.3 | 28.4 | 34.4 |
| DEG | 1.65 | 1.68 | 2.27 |
| Catalyst added |  |  |  |
| Mn ppm | 54 | 54 | 54 |
| Li ppm |  | 145/145 | 145/145 |
| Co ppm | 18 | 18 | 20 |
| Sb ppm | 330 | 330 | 330 |
| $TiO_2$ added (wt. %) | 0.30 | 0.30 | 0.30 |
| Phosphorous in ppm | 54 | 54 | 54 |

Experiment 1 is a control wherein cobalt was added prior to the sequestering of the manganese. Total reaction time was 380 minutes and the copolyester was found to be brittle and difficult to cut after extrusion from the autoclave.

In control Experiment 2, cobalt was added along with the manganese and lithium before the ester interchange reaction, Li was added after the ester interchange and before the direct esterification, while only antimony was the polycondensation catalyst. The ester interchange time for Experiment 2 was significantly more than for Experiment 1 and deemed unacceptable.

Experiment 3 employed as ester interchange catalysts manganese and lithium, additional lithium for direct esterification and cobalt and antimony were employed as polycondensation catalysts. The cobalt was added after the manganese was sequestered. The amounts of catalyst were the same as employed in Experiment 2. Reaction time was shorter than that of Experiment 1 and the copolyester was found to be much easier to cut after extrusion from the autoclave. In comparing Experiment 3 with Experiment 2, it is obvious that the addition of cobalt after the ester interchange reaction contributes to the improved process and illustrates the importance as to the timing of the addition. Simple combination of the catalysts is not enough to achieve the present invention.

EXAMPLE 2

The Experimental Procedure previously described was followed for this example, except large batches of the copolyester were preferred. For comparative purposes, various catalyst systems were used. Additionally, the mole ratio of EG/DMT was varied between 2.2 and 2.5. The ester interchange temperature was 225° C., the direct esterification temperature was 240° C. and the polycondensation temperature was 285° C.

In Experiments 1 (a control) manganese, cobalt and antimony were added as catalysts prior to ester interchange reaction at about 54 ppm manganese, 16 ppm cobalt and 330 ppm antimony based upon the expected yield of the polymer. The manganese was in the form of manganese acetate and the cobalt was in the form of cobalt acetate. At the end of direct esterification, 54 ppm of phosphorous was added. No lithium was added in this experiment.

In Experiment 2 (a control) manganese, lithium, cobalt and antimony were added prior to the ester interchange reaction and an equal amount of lithium after the ester interchange reaction and before the direct esterification reaction. The amounts of manganese, cobalt and antimony were the same as in Experiment 1, while the lithium was added in the amount of 88 ppm prior to the ester interchange and about 88 ppm of lithium wa added after the ester interchange and before the direct esterification. Phosphorous was added after the direct esterification.

In Experiment 3 manganese and lithium were added prior to the ester interchange reaction, additional lithium added for direct esterification and antimony was added as the catalyst for the polycondensation stage. Specifically, about 54 ppm of manganese and about 88 ppm of lithium were added in the form of acetates for ester interchange, an additional 88 ppm of lithium was added for direct esterification and 330 ppm of antimony was added for the polycondensation. At the end of the direct esterification, 54 ppm of phosphorous was added. No cobalt was added in this experiment.

In Experiments 4 and 5, manganese and lithium were added prior to the ester interchange reaction, additional lithium added for direct esterification and cobalt and antimony were added as the catalysts for the polycondensation reaction. The cobalt was added after the manganese was sequestered. Specifically, 54 ppm of manganese and 88 ppm of lithium were added in the form of acetates for ester interchange, 88 ppm of lithium was added for direct esterification, 18 ppm of cobalt and 330 ppm of antimony were added. At the end of the ester interchange reaction, 54 ppm of phosphorous was added.

The results of Example 2 are set forth in Table 2.

TABLE 2

|  | 1 | 2 | 3 | 4 | 5 |
|---|---|---|---|---|---|
| Ester Interchange Catalyst | Mn/Co | Mn/Li/Co | Mn/Li | Mn/Li | Mn/Li |
| Direct Esterification Catalyst |  | Li | Li | Li | Li |
| Polycondensation Catalyst | Sb | Sb | Sb | Co/Sb | Co/Sb |
| Ester Interchange Time (min.) | 161 | 129 | 138 | 124 | 104 |
| Direct Esterifica- | 114 | 116 | 120 | 99 | 93 |

TABLE 2-continued

|  | 1 | 2 | 3 | 4 | 5 |
|---|---|---|---|---|---|
| tion Time (min.) |  |  |  |  |  |
| Polycondensation Time | 320 | 265 | 273 | 230 | 216 |
| Total Time (min.) | 595 | 510 | 531 | 453 | 413 |
| Mole Ratio EG/DMT | 2.5 | 2.5 | 2.2 | 2.3 | 2.3 |
| IV in deciliters/gm | .708 | .663 | .654 | .674 | .638 |
| Catalyst added |  |  |  |  |  |
| Mn ppm | 54 | 54 | 54 | 54 | 54 |
| Li ppm |  | 88/88 | 88/88 | 88/88 | 88/88 |
| Co ppm | 16 | 16 |  | 18 | 18 |
| Sb ppm | 330 | 330 | 330 | 330 | 330 |
| TiO$_2$ (wt. %) | 0.3 | 0.3 | 0.3 | 0.3 | 0.3 |
| Phosphorous ppm | 54 | 54 | 54 | 54 | 54 |
| Vacuum letdown time (min.) | 60 | 60 | 40 | 30 | 30 |
| Temp EI (°C.) | 218 | 214 | 214 | 216 | 212 |
| Temp DE (°C.) | 250 | 250 | 250 | 250 | 245 |
| Temp Polycondensation (°C.) | 285 | 281 | 282 | 284 | 285 |
| Outlet time (min.) | 54 | 62 | 52 | 66 | 56 |

Experiment 1 is a control wherein the catalysts manganese and cobalt were added prior to the ester interchange Total reaction time for the ester interchange, direct esterification and polycondensation was about 595 minutes. Copolyester produced was found to be brittle, being difficult to cut after cooling.

In control Experiment 2, cobalt was added along with the antimony, manganese and lithium before the ester interchange, an equal amount of Li was added after the ester interchange and before the direct esterification. Addition of the lithium resulted in reduced total reaction time Copolyester produced had enhanced melt flow characteristics and provided for improved cutting after cooling. However, the color was deemed unacceptable.

Experiments 3, 4 and 5 employed the catalysts and sequence of reactions of the present invention. Preferred embodiments as shown in Experiments 4 and 5 resulted in a significant reduction in time in the neighborhood of about 30% in comparison to Experiment 1. Furthermore, the enhanced copolyester was much easier to cut after cooling, and had acceptable viscosity and color properties. In comparing Experiments 3-5 with Experiments 1 or 2, it is obvious that the addition of cobalt after the ester interchange reaction (sequestering of manganese) contributes to the improved process and illustrates the timing of the addition. Furthermore, the combination of the catalyst systems with the sequence of reactions leads to an enhanced copolyester having superior properties with respect to cutting and to bonding.

Thus, it is apparent that there has been provided, in accordance with the invention, a catalyst system in combination with a method of preparing copolyester from a lower dialkyl ester of a terephthalic acid and glycol, and a slurry of dicarboxylic acid/glycol, using the catalyst system that fully satisfies the objects, aims and advantages as set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations that fall within the sphere an scope of the invention.

That which is claimed is:

1. In a process for making a copolyester from a lower dialkyl ester of a terephthalic acid, a dicarboxylic acid having the formula $$HO-\overset{O}{\underset{\|}{C}}-R-\overset{O}{\underset{\|}{C}}-OH$$

wherein R is selected from the group consisting of

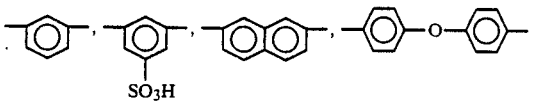

and—$(CH_2)_n$—where n=2-12 and a glycol comprising the steps of:
   a. reacting said lower alkyl ester of terephthalic acid and glycol by an ester interchange reaction to produce a first monomer and alcohol;
   b. removing said alcohol during said ester interchange reaction;
   c. reacting a mixture of dicarboxylic acid and glycol by a direct esterification reaction to produce a second monomer and water;
   d. polymerizing a mixture of said first and second monomers by a polycondensation reaction to produce said copolyester and glycol; and
   e. removing said glycol during said polycondensation reaction;

wherein the improvement comprises: adding an effective catalytic amount of manganese and lithium before or during said ester interchange reaction and said direct esterification; and adding an effective catalytic amount of antimony at or before the beginning of the polycondensation reaction.

2. In the process of claim 1 wherein said manganese, lithium, and antimony are in the form of salts.

3. In the process of claim 1, wherein said manganese, lithium, and antimony are in the form of organic compounds or inorganic compounds.

4. In the process of claim 3, wherein said organic compounds are selected from the class of carboxylated metallic salts or metal amines.

5. In the process of claim 3, wherein said inorganic compounds are selected from the class of metal halides and metal compounds of Group IV.

6. In the process of claim 1, wherein said manganese, and lithium are in the form of acetates and said antimony is in the form of oxide.

7. In the process of claim 1, wherein said lower dialkyl ester is dimethyl terephthalate, and said glycol is ethylene glycol.

8. In the process of claim 1, wherein said ester interchange reaction occurs at a temperature range of from about 150° C. to about 250° C., and at about atmospheric pressure.

9. In the process of claim 8, wherein said polycondensation reaction occurs at a temperature range of from about 250° C. to about 310° C. and at a pressure of from about 0.1 to about 3.0 mm mercury vacuum.

10. In the process of claim 1, wherein said manganese is present in a range of from about 20 ppm to about 150 ppm, said lithium is present in a range of from about 50 ppm to about 350 ppm, and said antimony is present in a range of from about 200 ppm to about 400 ppm, wherein all amounts are based on the expected yield of said copolyester.

11. In the process of claim 1, wherein said manganese is sequestered after said ester interchange reaction is substantially completed or during said polycondensation reaction by adding a sequestering agent.

12. In a process for making a copolyester from a lower dialkyl ester of a terephthalic acid, a dicarboxylic acid having the formula $$HO-\overset{O}{\underset{\|}{C}}-R-\overset{O}{\underset{\|}{C}}-OH$$

wherein R is a selected from the group consisting of

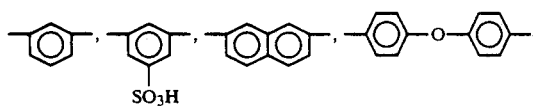

and —(CH2)$_n$— where n=2-12 and a glycol comprising the steps of:

a. reacting said lower alkyl ester of terephthalic acid and glycol by an ester interchange reaction to produce a first monomer and alcohol;

b. removing said alcohol during said ester interchange reaction;

c. reacting a mixture of dicarboxylic acid and glycol with said first monomer by a direct esterification reaction to produce a second monomer and water;

d. polymerizing a mixture of said first and second monomers by a polycondensation reaction to produce said copolyester and glycol; and e. removing said glycol during said polycondensation reaction;

wherein the improvement comprises: adding an effective catalytic amount of manganese and lithium before or during said ester interchange reactions; and adding an effective catalytic amount of cobalt and antimony at or before the beginning of or during the polycondensation reaction, with the proviso that said cobalt not be added prior to substantial completion of said ester interchange reactions.

13. In the process of claim 12, wherein said manganese is present in a range of from about 20ppm to about 150 ppm, said lithium is present in a range of from about 50 ppm to about 350 ppm, said cobalt is present in a range of from about 10 ppm to about 70 ppm, and said antimony is present in a range of from about 200 ppm to about 400 ppm, wherein all amounts are based on the expected yield of said polyester.

14. A copolyester made from the process of claim 1.
15. A copolyester made from the process of claim 10.
16. A copolyester made from the process of claim 11.
17. A copolyester made from the process of claim 12.
18. An enhanced copolyester of polyethylene terephthalate/isophthalate comprising from about 20 ppm to about 150 ppm Mn, from about 50 ppm to about 350 ppm Li, and from about 200 ppm to about 400 ppm antimony.

* * * * *